Patented Nov. 1, 1932

1,886,233

UNITED STATES PATENT OFFICE

ARTHUR H. SANDERS, OF FRESNO, CALIFORNIA

TREATMENT OF DRIED FRUITS AND RAISINS

No Drawing.   Application filed December 1, 1928.   Serial No. 323,205.

This invention relates to the treatment of dried fruits and raisins. It is particularly directed towards the treatment of such fruits and raisins in order to sterilize the same and keep them from becoming wormy or from other rapid deterioration between the time of packing and the time of reaching the hands of the consumer.

A still further object of the invention is to so treat the fruits and raisins so that when packed the individual fruits or raisins will be readily separable and will not stick in a conglomerate mass as is now the common condition, which is occasioned by the fact that the natural sugars of the same are pressed out or exuded from the same during the treatment thereof, but by my improved method I aim to seal these natural sugars within the skins of the same and thus when packed the individual pieces of the same are not adhered together but are readily separable and can be poured into batter, dough or weighed in an automatic weighing machine without sticking together.

A still further object of the invention is to carry out my improved method in such a way as to thoroughly remove all dust, dirt and sand and other deleterious material from the fruit or raisins and to produce an absolutely clean and sanitary product, which has been more or less impossible under the methods of treating the same heretofore indulged in.

The essential objective of my improved process for the treatment of the fruits and raisins may be carried out by many forms of mechanical apparatus, and I lay no claim to any particular type of apparatus, and therefore have not here shown or described the same, but will set forth the several steps of my improved treatment giving by way of suggestion only a brief résumé of apparatus of general types which may be used in connection therewith.

Describing my improved method, particularly in connection with the treatment of raisins, same consists essentially in first drying the raisins in any of the ways now in commercial use such as by sun drying or by means of mechanical dehydrators.

I then take the dried raisins and process the same for the purpose of softening them and rendering the skins thereof pliable. This processing may be carried out by any of the known processes, either by passing them through steam or hot water and allowing them to stay therein for a period of from one to seven minutes, depending on the character or condition of the raisins. I next provide a vat containing water to which I add one pound of cocoanut oil (preferably Lawson process 76 degrees) to each two hundred gallons of water by volume, and I consistently maintain this relationship of the water and oil. This water is maintained at boiling heat either by closed or open steam pipes or other known means, although preferably a closed steam pipe is used.

The raisins which have been previously processed with the steam or hot water to soften same and render them pliable are then dumped into the boiling water and oil. The action of the boiling water tends to free and relieve the raisins of all dust, dirt, sand or other material which is occasionally drawn off through suitable conduits at the bottom of the vat. The raisins seem to have an affinity for the oil in the water and the oil therefore adheres to the same.

The raisins are allowed to remain submerged in this boiling water and oil for some thirty to ninety seconds depending on the condition thereof, and are then carried from the vat by any suitable conveyor means from which they are delivered onto a shaker on which they are drained and subsequently delivered to a raisin seeder, where they are seeded in the regular way. The action of the seeder tends to press or impregnate the oil throughout the raisin and after having passed through the seeder the raisins are delivered preferably to a trunnel and passed therethrough for the purpose of healing the wounds in the raisins made by the seeder so as to improve the surface appearance thereof and make them look smooth instead of ragged and torn as is the condition under present practices.

From the trunnel the raisins are then conveyed by any suitable means into a drier of desired type. Here they are subjected to the action of the drier at a heat of preferably not less than 100 to 150 degrees depending on the character of the raisins. Here the excess moisture is drawn from the raisins and the oil therein is caused to form a film over the surface thereof and from the drier the raisins are then immediately passed to a suitable cooling means to cool the same and congeal the oil to form an encasement around the individual raisins.

As stated, this treatment of the fruit with the oil tends to seal the inherent sugars within the skins of the raisins so that they do not exude and form a gummy and sticky mass, and the mass of raisins is therefore free flowing and may be readily flowed or poured into automatically weighing machines and into containers, and when the containers reach the consumer the raisins may also be readily poured therefrom for such use as it may be desired to put them to.

In connection with the use of seedless raisins and currants the passing of the same through the seeder is not necessary from a standpoint of removing seeds, but are preferably put through the seeder in order to remove rocks, glass, nails and other débris which very often accumulates in the same, and furthermore to perforate the skins for the purpose of impregnating the oil throughout the body of the raisins or currants.

While I have described the improved process as specifically applied to the treatment of raisins, still the same process may be applied to other fruits such as dried prunes, figs, and the like, and the impregnation of the same with the oil will be found to have a similar effect thereon, namely to seal the natural sugars into the same, sterilize the fruit and cause it to be free flowing and to maintain the same in fit condition over a long period of time without becoming wormy or otherwise deteriorating.

While I have described in some detail the present and preferred manner of carrying out the steps of the process and the apparatus to be used in connection therewith, still in practice I may find it desirable to make certain deviations therefrom, and I therefore do not propose to limit myself to any such specific details, but make use of such modifications thereof as may appear desirable and which come within the scope of the appended claims.

Having thus described my invention what I claim as new and useful and desire to secure by Letters Patent is:

1. The method of treating dried fruits and raisins comprising submerging the same in boiling water to which cocoanut oil has been added, then withdrawing the same from the water, puncturing the same to cause the oil to be impregnated therein, then subjecting the same to heat and then cooling the same.

2. The method of applying a protective film of edible vegetable oil to dried fruits comprising submerging the fruit in boiling water to which the oil has been added, removing the fruit from the water, puncturing the fruit to allow the oil adhering thereto to become impregnated within the body thereof, healing the puncture wounds, heating the fruit to remove excess moisture therefrom and cause the oil to flow into a final film over the body of the fruit, and then cooling the fruit to congeal the oil into an encasement around the fruit.

In testimony whereof I affix my signature.

ARTHUR H. SANDERS.